March 11, 1941.  H. A. COPE  2,234,588
FISHHOOK SPREADER
Filed March 23, 1940
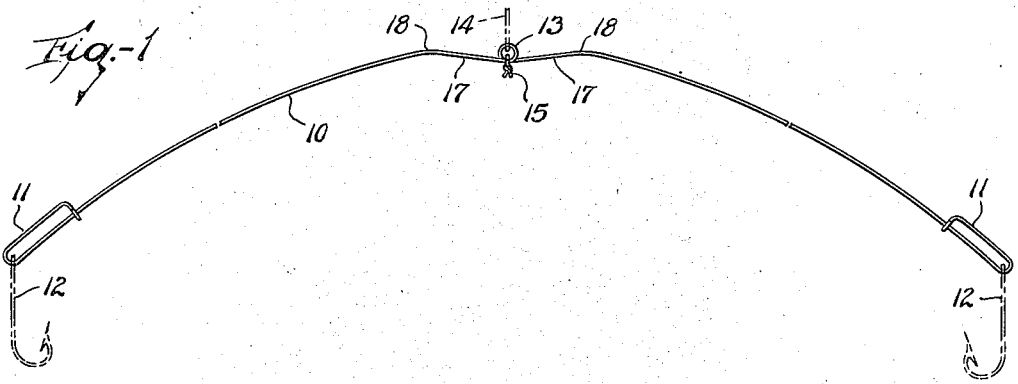
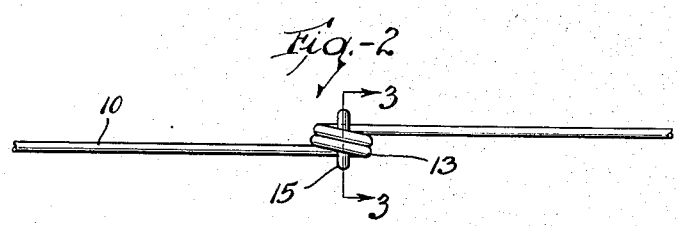
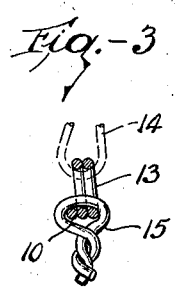
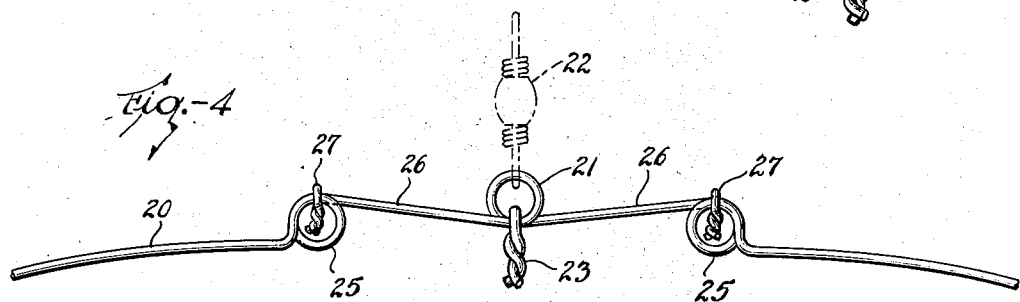
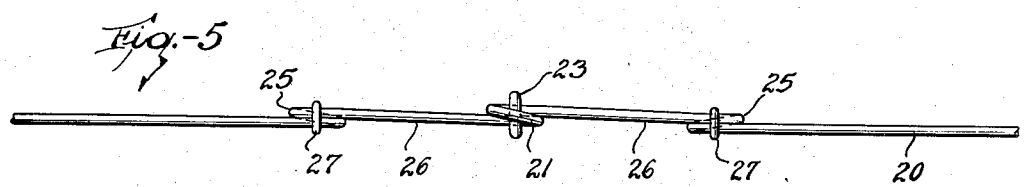
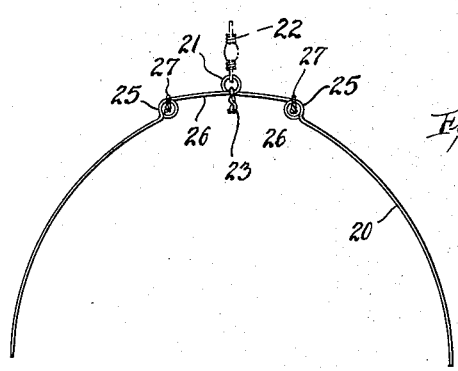
INVENTOR
HARRY A. COPE
BY
ATTORNEYS Patented Mar. 11, 1941

2,234,588

UNITED STATES PATENT OFFICE 2,234,588

FISHHOOK SPREADER

Harry A. Cope, Akron, Ohio

Application March 23, 1940, Serial No. 325,538

6 Claims. (Cl. 43—28)

This invention relates to fishhook spreaders such as are used for attaching a plurality of fishhooks to a fishing line, and which are adapted to prevent the hooks from fouling the line and which keep the hooks spaced from each other under all conditions of service.

Fishhook spreaders of the character mentioned usually are made of spring steel wire that readily flexes under strain, and which will return to normal position when relieved of said strain, except in those cases where the strain is localized in a manner that causes an abrupt bend in the wire.

The chief objects of this invention are to provide an improved fishhook spreader of the character mentioned; and to provide against collapse of the spreader due to sharp local flexure thereof. More specifically the invention aims to provide a wire fishhook spreader of such construction that portions thereof are reinforced to resist flexure, and another portion at least is so constructed as to distribute the flexing strains throughout a sufficient length of the wire that no sharp bending of the wire is possible. Further objects include simplicity of construction and low cost of manufacture. Other objects will be manifest as the description proceeds.

Of the accompanying drawing:

Figure 1 is an elevation of one embodiment of the improved spreader;

Figure 2 is a plan view, on a larger scale, of the medial portion of the structure shown in Fig. 1;

Figure 3 is a section on the line 3—3 of Fig. 2;

Figure 4 is a fragmentary elevation, on a larger scale, of the medial portion of another embodiment of the invention;

Figure 5 is a plan view of the structure shown in Fig. 4; and

Figure 6 is a view of the structure shown in Fig. 4, on a smaller scale, as it appears when flexed and under load.

Referring first to Figs. 1 to 3 of the drawing, there is shown a spreader consisting essentially of a single length of resilient wire 10 that is bowed or bent to general arcuate shape and terminating at each end in safety loops or eyes 11 to which respective hooks, indicated in broken lines at 12, may be attached either with or without snells as desired. At its center the spreader is formed with a vertically disposed upstanding circular loop or coil 13 that is formed of two convolutions of the wire 10, said loop providing means for attachment of the spreader to a fishline, swivel, or other form of connection indicated by broken lines at 14 extending upwardly therefrom. The arrangement is such that those portions of the spreader that extend from the coil 13 to the hooks 12 enter the coil at the bottom thereof, with the result that strain on the spreader, such as compresses the same by moving the terminal portions thereof toward each other, merely tends to spread or open the loop, and there is no abrupt flexing of the wire such as would result in a permanent bend therein.

It is desired, however, that a part of the flexing strain at least be distributed so as not to be localized in the loop 13, and to this end means is provided for limiting the extent to which the loop can open. Said means consists of a small tie-wire 15 wrapped loosely about the coils of the loop 13, at the bottom thereof, the ends of the tie-wire being twisted together as shown. The wire 15 is sufficiently loose on the coil 13 to allow for some expansion or opening of the latter, but definitely limits the expansion of the coil so that whenever the spreader is placed under strain sufficient to effect complete compression thereof, there will be some flexure of the wire laterally of the coil or loop. Because of the presence of the loop 13, such flexure of the wire laterally thereof is not as great as it otherwise would be, and there is no likelihood of putting an abrupt bend in the wire.

Furthermore, the wire laterally of the loop, at each side thereof, is so formed as to function under load in a manner that obviates sharp flexure. Thus the wire extending laterally from the loop 13, at opposite sides thereof, extends in a slightly upward direction in the regions designated 17, 17, Fig. 1, said regions being straight, and terminating in gentle reverse curves 18, 18 that merge with the respective arcuate portions of the spreader therebeyond. The arrangement is such that when the spreader is put under strain such as moves the hooks 12 toward each other, the straight portions 17 of the spreader swing angularly about the loop 13 without flexing, as said loop expands, until further expansion of the loop is prevented by the tie-wire 15, said portions 17 thereafter bowing slightly as the spreader attains complete compression.

The invention is simple in construction, it may be completely compressed in service without being permanently deformed due to abrupt bending, and it achieves the other advantages set out in the foregoing statement of objects.

The embodiment of the invention shown in Figs. 4 to 6 of the drawing is essentially similar to that previously described, and consists of a single wire 20 that is bent to the generally arcuate form of the embodiment previously described, the formations at the opposite ends of the wire being omitted. At its center the spreader is formed with a vertically disposed, upstanding, circular loop or coil 21 that is similar to the coil 13 previously described except that it consists of but one convolution of wire instead of two, said coil providing means for attachment to the spreader of connecting means such as the swivel shown in broken lines at 22. As in the previously described embodiment, the loop 21 is embraced at its bottom, where the ends of its convolution overlap, by a loose fitting tie-wire 23 that limits the expansion of the coil in the manner previously described.

The spreader wire extends laterally in opposite directions from the bottom of the loop 21, in a slightly upward direction, to respective vertically disposed coils or loops 25, 25, the portions between the loop 21 and the loops 25, which are designated 26, 26, being straight and without curvature. Portions 26 of the spreader enter the loops 25 at the top thereof and leave the same at the sides thereof, each loop thus constituting about one and one-fourth convolutions. From the loops 25 the wire of the spreader extends arcuately to the hook-eyes not shown at the respective ends of the spreader. The arrangement is such that when the spreader is compressed as by the movement of hook-ends thereof toward each other, the effect is to contract or tighten the coils or loops 25, but the resistance of the latter to tightening is greater than the resistance to flexure of the uncoiled wire, so said loops prevent flexure at these points and serve to stiffen or reinforce the wire. As a further assurance against contraction of the loops 25, the contiguous convolutions thereof may be bound together by respective tie-wires 27, the ends of the latter being twisted together and arranged within the loops as shown.

As in the first described embodiment of the invention, upon compression of the spreader the straight portions 26 of the spreader move angularly in a downward direction as the loop 21 opens, until further opening of the loop is limited by the tie-wire 23, said portions 26 thereafter flexing and assuming the arcuate form shown in Fig. 6. Thus it will be seen that the loops 25 strengthen the wire so that much of the flexure of the spreader upon compression, is localized between the said loops, where only a portion of the strain results in bending of the wire, the remainder of the strain being absorbed in the expanding of the loop 21. Thus there is no portion of the spreader that is subjected to strain of sufficient severity to produce an abrupt bend therein.

Other modifications may be resorted to without departing from the spirit of the invention or the scope thereof as defined by the appended claims.

What is claimed is:

1. A fishhook spreader comprising a generally arcuate structure formed of a single wire having its ends bent into eyes for the reception of hooks, an upstanding vertically disposed spring coil formed in the wire structure centrally thereof to which a fish line may be connected, the wire entering the coil from the bottom thereof so that the coil expands when the spreader is compressed by movement of its ends toward each other, and means for limiting the expansion of the coil upon compression of the spreader.

2. A fishhook spreader comprising a generally arcuate structure formed of a single wire having its ends bent into eyes for the reception of hooks, an upstanding vertically disposed spring coil formed at the center of the structure to which a fish line may be connected, the wire entering the coil at the bottom thereof so that compression of the spreader by movement of its ends toward each other results in the expansion of the coil, and a tie-wire on the coil determinately limiting the expansion thereof.

3. A fishhook spreader comprising a generally arcuate structure formed of a single wire having its ends bent into eyes for the reception of hooks, and a vertically disposed spring coil formed at the center of the wire structure to which a fish line may be connected, the wire extending laterally each way from the bottom of the coil, normally straight and somewhat upwardly for a limited distance, and therebeyond curving downwardly to the hook eyes.

4. A fishhook spreader comprising a generally arcuate structure formed of a single wire having its ends bent into eyes for the reception of hooks, a vertically disposed spring coil formed at the center of the wire structure to which a fish line may be connected, the wire entering the coil from the bottom thereof so that compression of the spreader by movement of its ends toward each other results in expansion of the coil, and means disposed each side of the coil for stiffening the wire so that flexure due to compression of the spreader is localized in the coil.

5. A fishhook spreader comprising a generally arcuate structure formed of a single wire having its ends bent into eyes for the reception of hooks, a vertically disposed spring coil formed at the center of the wire structure to which a fish line may be connected, the wire entering the coil from the bottom thereof so that compression of the spreader by movement of its ends toward each other results in expansion of the coil, and vertically disposed spring coils formed in the wire structure at each side of the first mentioned coil and in spaced relation thereto, the wires entering the lateral coils from the top thereof whereby compression of the spreader tends to constrict said coils.

6. A combination as defined in claim 5 in which the wire connecting the central coil and the lateral coils is straight and extends laterally from the central coil in an upwardly inclined direction.

HARRY A. COPE.